United States Patent [19]

Galer

[11] Patent Number: 4,777,004

[45] Date of Patent: Oct. 11, 1988

[54] APPARATUS AND METHOD FOR MOLDING PLASTIC PAINT CANS

[76] Inventor: Herbert W. Galer, 24 Woodland Trail, Newnan, Ga. 30263

[21] Appl. No.: 785,774

[22] Filed: Oct. 9, 1985

[51] Int. Cl.⁴ ............... B29C 33/44; B29C 33/46; B29C 41/42
[52] U.S. Cl. ............... 264/320; 249/58; 249/63; 249/180; 249/661; 264/318; 264/334; 264/335; 425/437; 425/438; 425/556; 425/577
[58] Field of Search ........... 264/318, 334, 335, 320; 425/436 RM, 438, 577, DIG. 5, DIG. 58, 443, 437, DIG. 102, 556; 249/63, 66 A, 66 C, 144, 162, 161, 66 R, 180, 58

[56] References Cited

U.S. PATENT DOCUMENTS 4,521,367 6/1985 Underwood .................. 264/318
4,570,897 2/1986 Von Holdt ................ 425/438 X

FOREIGN PATENT DOCUMENTS 56-37138 4/1981 Japan ..................... 264/318

Primary Examiner—Jan H. Silbaugh
Assistant Examiner—Leo B. Tentoni
Attorney, Agent, or Firm—William L. Krayer

[57] ABSTRACT

Apparatus and method are described for injection molding of thermoplastic paint cans substantially similar in size and design to the conventional steel one-gallon paint can. The apparatus comprises a cavity element defining the exterior of the container body and a core mold element including a peripheral lip protruding into the interior of the can body at a point below the upper terminus of the top circumference of the container body, thus providing a peripheral upwardly projecting edge. The cavity element includes a plurality of cam elements which move cooperatively on separation of the core and cavity elements. The cam elements grip the ridge of the container and expand it outwardly sufficiently to permit the core element of the mold to be removed from the container without hindrance from the inwardly protruding lip.

12 Claims, 4 Drawing Sheets

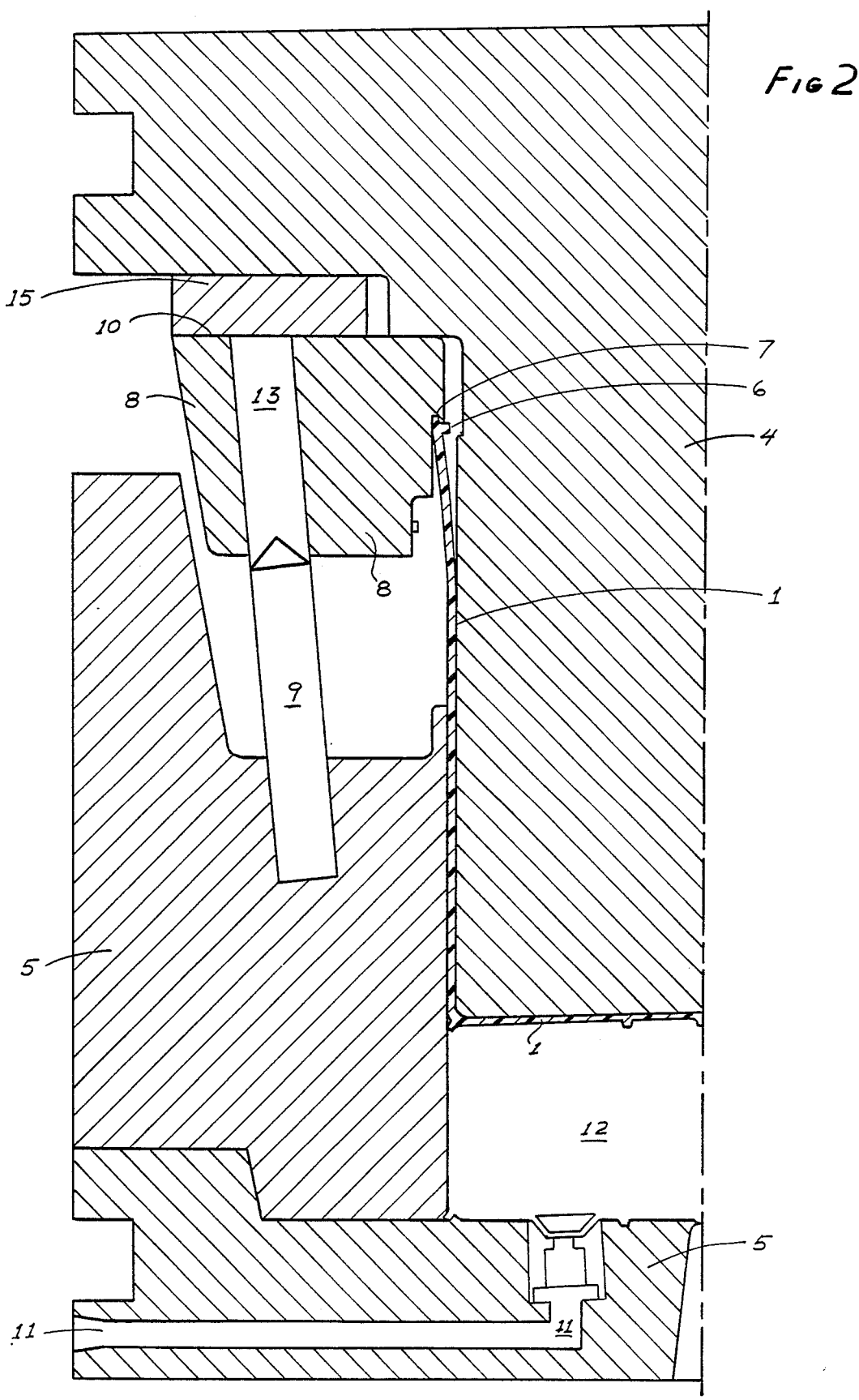

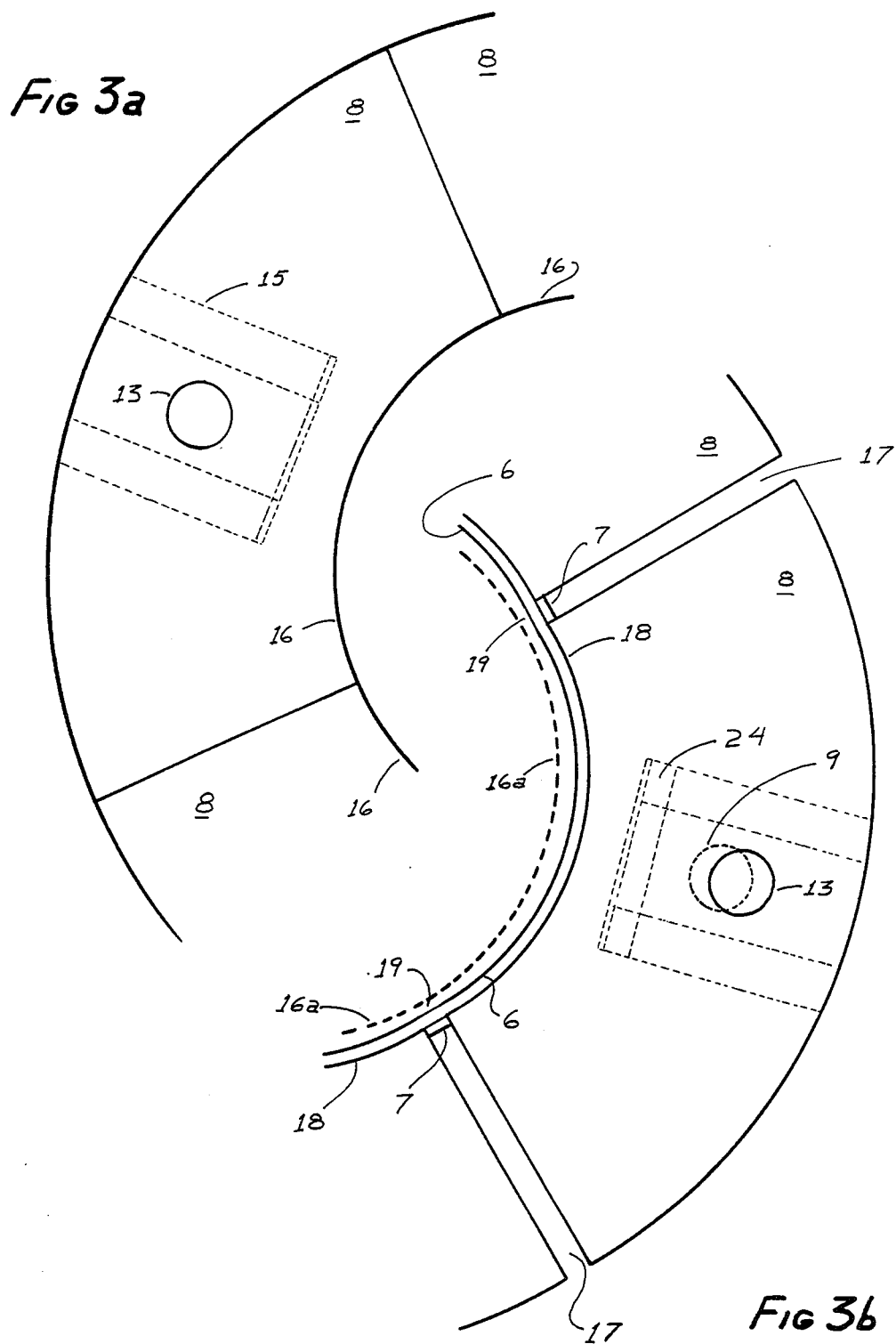

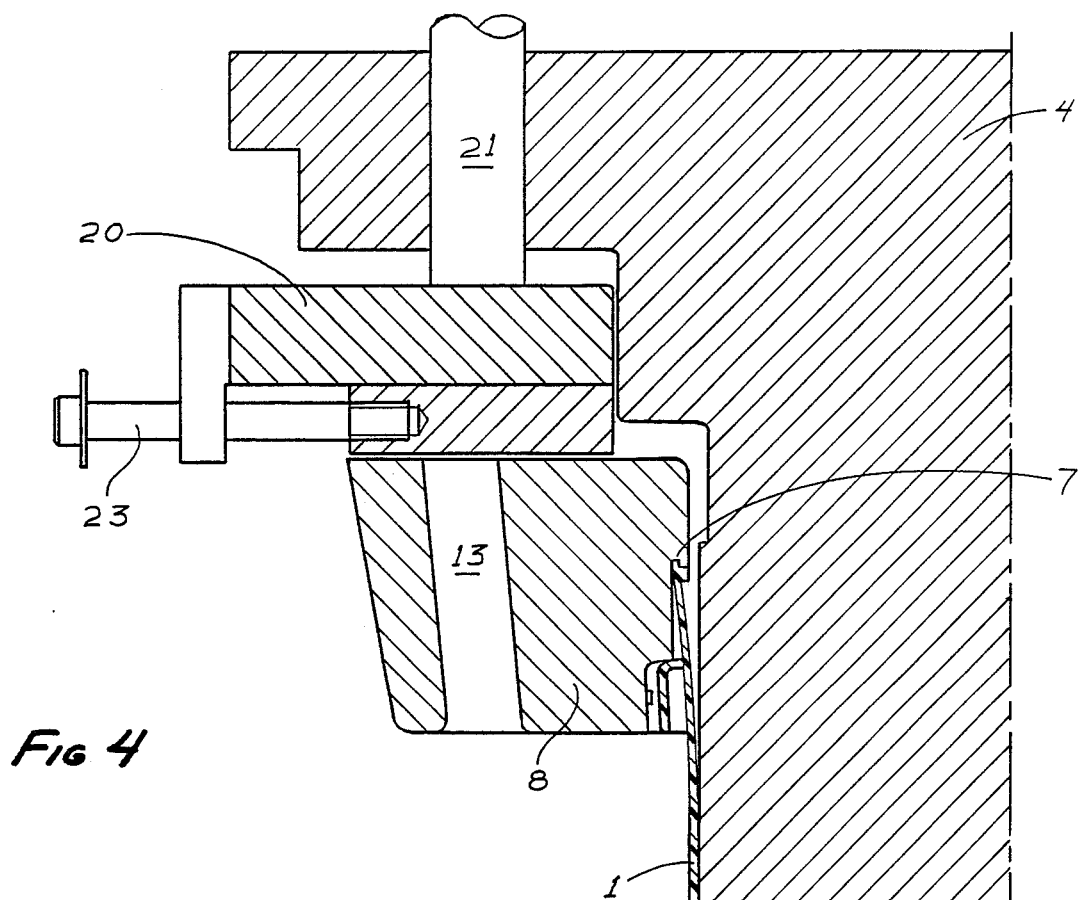

APPARATUS AND METHOD FOR MOLDING PLASTIC PAINT CANS

This invention relates to methods and molding apparatus for making paint cans and other articles by injection molding wherein the mold design requires that a molded part project into the space occupied by the mold core, thus blocking the path for removal of the mold core. This difficulty is overcome by bending and stretching the periphery of the molded article to remove it from the path of the mold core; means for accomplishing the bending and stretching are disclosed.

BACKGROUND OF THE INVENTION

The ordinary one-gallon paint can has long been made of steel.

In spite of persistent shortcomings of steel, such as corrosion, particularly when used for aqueous-based paints, a plastic container has not been developed which has proven capable of displacing the standard steel can from the marketplace. The difficulty is not one of can design but of mold design.

Letica, for example, in U.S. Pat. Nos. 4,349,119 and 4,293,080, illustrates reinforced plastic can designs which are different from the standard steel paint can design and therefore would require costly changes in the filling and packaging lines of existing paint factories. The mold must have a collapsible core, which inevitably will manifest mechanical difficulties.

While Holt in U.S. Pat. No. 3,977,563 does not require a collapsible core since he does not employ an inwardly-protruding lip for the lid, this significant departure from existing paint can design would require major changes in the filling and packaging lines of the paint companies, since the lids are not essentially the same as those for the standard metal can.

Von Holdt, in U.S. Pat. Nos. 4,512,494 and 4,286,766, illustrates a collapsible core which may be removed in spite of the inwardly projecting lip which he recognizes as necessary. However, the collapsible core is complicated and susceptible to mechanical breakdown and maintenance problems; moreover, Von Holdt finds it necessary to taper the entire mold.

SUMMARY OF THE INVENTION

I have devised a simple and efficient mold and method of molding plastic containers and other similar articles in spite of the presence of an inwardly projecting peripheral lip in the molded article which inhibits the removal of the mold core.

My invention takes advantage of the fact that conventional thermoplastics such as polyethylene, polypropylene and other polyolefins, ABS, nylon, and other thermoplastics such as many materials containing elastomeric additives, can be stretched and/or bent without damaging them. Specifically, my invention includes the method of removing a core mold element from a newly molded article made of a resilient or stretchable thermoplastic such as a container which has a cavity and an integral molded part thereof obstructing the normal path for the removal of the mold core, which method comprises bending and stretching the molded part after its separation from the mold cavity to expand the peripherally obstructing part to remove it from the path of the mold core substantially and uniformly around its periphery and thus enable separation from the mold core.

BRIEF DESCRIPTION OF THE DRAWINGS

FIGS. 1, 2, and 4 are side sectional views of one-half of a symmetrical mold apparatus showing a newly molded thermoplastic can in three successive stages of separation from the mold.

FIGS. 3a and 3b are more or less diagrammatic overhead views of sections of the mold apparatus showing particularly a single cam in the closed and open positions respectively.

DETAILED DESCRIPTION OF THE INVENTION

Figure 1:
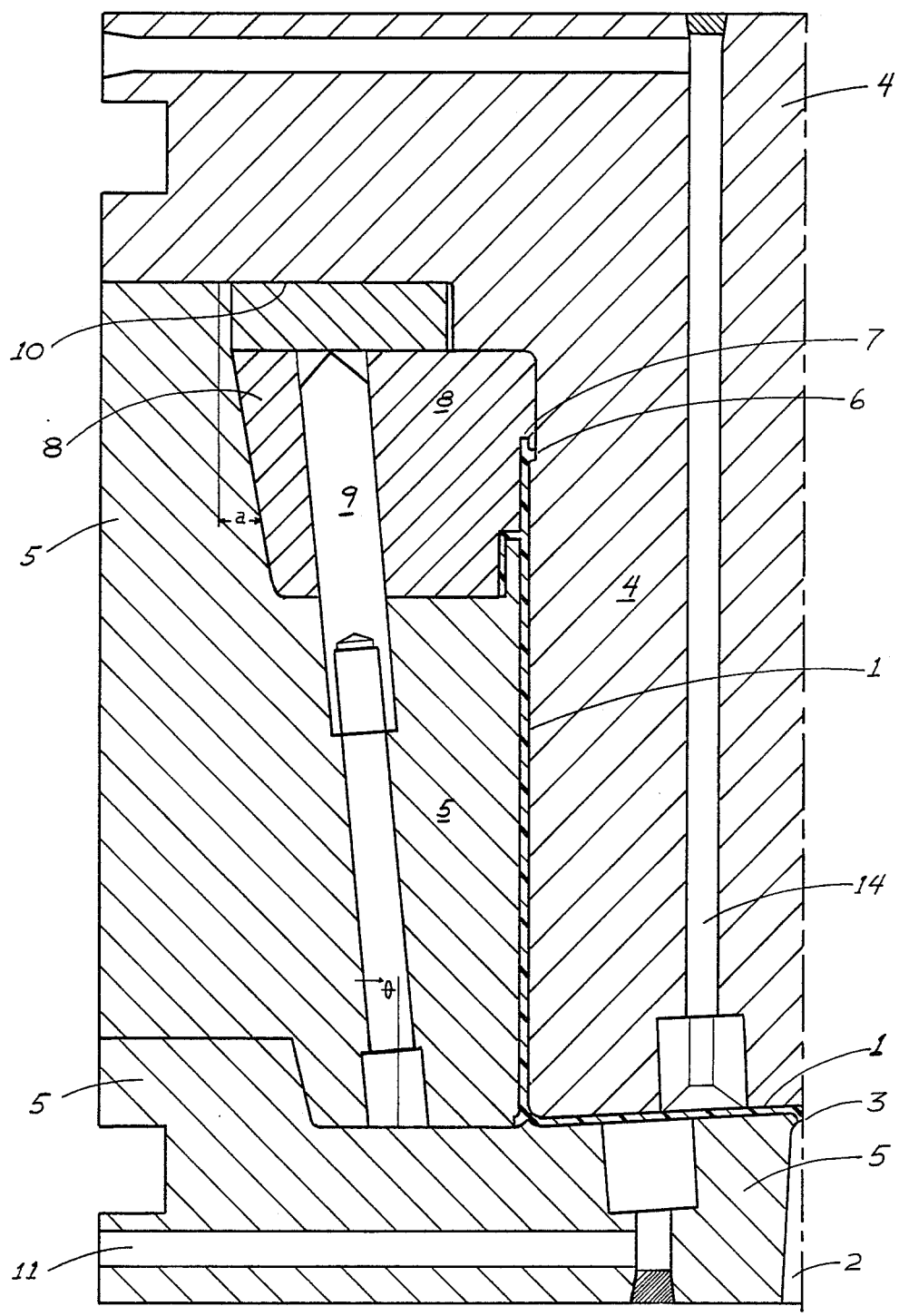

In FIG. 1, container body 1 has just been formed from a thermoplastic material such as polyethylene or polypropylene injected in the conventional manner through sprue 2 and gate 3 into the space defined primarily by mold core 4 and mold cavity 5. The container body 1 is designed to include a peripheral inwardly projecting lip 6 to receive a lid or a circumferential lid support (not illustrated) and which in any event is made in a separate mold and separate step.

The part of the container body above the inwardly projecting lip 6 forms an upper edge 7 of the container body wall. The interior surface of upper edge 7 is defined not by the main body of mold core 4 but by cams 8.

There should be at least about four cams 8 around the periphery of the container, and there may be as many as sixteen or more. Each cam 8 is associated with, i.e. is in slidable contact with, a guide 9 and a tee slot 10. Preferably the angle theta should be about 1° to about 8° from the wall of container 1. Angle alpha is preferably at least as great as angle theta.

Referring now to FIG. 2, compressed air has been introduced through passage 11 to the space 12 below container body 1 to cause it to move upwardly, of course taking the mold core 4 and container body 1 with it. Cam 8 has moved upwardly with core 4; however, cam 8 is also urged outwardly away from core 4, by guide 9 with which it is in contact. Guide 9 is aligned at, in this case, a five degree angle from the vertical. While the cam 8 travels upwardly, the guide 15 is urged horizontally to the left, i.e. away from the mold core, through tee slot 10. The recess 13 shown in contact with guide 9, and guide 9, may extend as far into or beyond the main portion of core element 4 as is necessary to ensure that the upper edge 7 is still radially urged outwardly at the point when the molded container body 1 is completely removed from the cavity 5, so that when compressed air is introduced through core passage 14 (see FIG. 1) to eject the completed container body 1, it will be free of the mold cavity.

Generally, it is recommended that the cams 8 effect a radial stretching only slightly greater than the inward projection of lip 6. Thus, the angle of guide 9 from the vertical is determined by the ratio of the height of the container body 1 and the distance projected by lip 6. This generally slight angle, i.e. from less than one degree to, say, eight degrees, for standard container designs, assures also that the velocity of the outward radial movement of the cam 8, and the upper edge 7, will be considerably less than the vertical velocity of the main mold core 4, thus minimizing the possibility of damage to the newly molded unit and to the working parts of the mold. (References to horizontal and vertical movement or orientation are for references to the drawing—they are relative; as persons skilled in the art are aware, the entire assembly may be turned as much as 180° in actual working relationship).

In FIG. 3a, contiguous cams 8 are shown more or less diagrammatically from overhead in the closed position; the contiguous cams 8 remain in this position during the injection and molding process, the inner edges 16 of cams 8 forming, in this case, a circle. In FIG. 3b, the original position of the internal curvature of the cam 8 is shown by dotted line 16a; it will be seen that projecting lip 6 of the newly molded plastic body has been radially expanded to a point beyond the circumference of the main body 1 of the container and its original circumference inside of line 16a, leaving spaces 17 between the cams 8. Line 18 represents the inside wall of upper edge 7, and portions of the outside wall of upper edge 7 may be seen in the spaces 17. It should be observed also that, due to the bending and stretching of the thermoplastic, the portions of upper edge 7 and projecting lip 6 which are between cams 8 are taut and straight relative to those portions of them which are actually held by cams 8 and follow their curvature. The spaces 19 between these taut or straight portions of projecting lip 6 and the original position 16a of the outside wall of the mold represents the clearance which will permit separation of the mold core 4 from the molded article 1. Space 24 represents the distance traveled by guide 15 and cam 8.

Referring to FIG. 4, an optional stripper plate 20 may be used for those cases wherein the molded (container) article 1 tends to stick to the mold core 4. As is known in the art, the stripper plate is a guided element of slip fit construction around the periphery of the mold core so that the molding machine ejector rods 21, when actuated, move the stripper plate along the longtitudinal axis of the core. Pin 23 urges cams 8 radially outward. Since, in this case, the stripper plate 20 carries the cams 8, the container 1 therefore is positively ejected (dislodged) from the core 4. Air is introduced through the core air passage 14, filling the lower space 22 between core 4 and the bottom of container 1 at about the same time the stripper plate 20 is actuated to assist in the separation. Ejector rods 21 are incorporated in the core half of the mold in order to guide the stripper plate the full length, or a partial length, of the mold core 4 so that the molded article can be fully ejected from the mold.

Persons skilled in the art will recognize that the container need not be cylindrical and indeed that the cam 8 may be made in any shape to accommodate the design of the container and to perform its function of pulling the inwardly protruding lip 6 away from the core so that the newly molded part may be blown off. My method includes the radial application of pressure on the top edge of a newly formed container or similar article by other means as well as cams of the type described. Obviously the pressure should be applied, i.e. the top edge of the container should be radially expanded, at or about the time the core having a recess filled with part of the molded container or article is about to be separated from the container or article. I may use thermoplastic having a very wide range of flexible modulus and/or elastic limit. Generally, any of the plastic compositions mentioned above and their many commercial variations are usable in my invention; in some cases, in fact, it may be desirable to "deform" the container or other article permanently—it may not be necessary for the periphery to assume its original dimensions after stretching, although in many cases this will be considered desirable. However, it is preferred that the plastic should be capable of being stretched at least about 3% without significant permanent deformation. If permanent deformation is desired, i.e. if stretching is beyond the proportional limit, the article should not, of course, be ruptured. Such permanent "set" of the plastic can be useful to "orient" the molecular structure and can have desirable effects on strength, impact resistance, stiffness and resistance to permeation.

The number of cams may be significant when tolerances between the outward movement of the cams and the width of the inward projection are close, primarily as a function of the clearance between cams. Since there is no outward force in the area between cams, the curvature of the mold may not clear the section of molded part, which will tend to remain straight and taut. Thus, as a general principle, many cams are preferred to a few.

It will also be recognized that the cam surface need not form any part of the mold cavity surface as the above described preferred embodiment illustrates. That is, the cam should extend over the inwardly projecting lip 6 and upper edge 7 of the container body, but need not form any part of the outer surface of the container body 1, even when it is irregular, such as when it has a projection for attachment of a bail.

I claim:

1. Method of removing a mold core from the interior of a newly molded thermoplastic container having an upper edge and an integral molded part peripherally obstructing the path of separation from the mold core by peripherally projecting into the mold core near the upper edge of the container, comprising radially bending and stretching the body of the container to radially expand the peripherally obstructing part away from the mold core to a diameter greater than that of the mold core by the application of radial outward pressure on the upper edge of the container, and thereafter removing the mold core.

2. Method of claim 1 wherein the molded article is made of polyolefin.

3. Method of claim 1 wherein the thermoplastic is capable of being stretched at least about 3% without substantial permanent deformation.

4. Method of claim 1 wherein the thermoplastic is stretched beyond its reformational limit but is not ruptured.

5. Method of claim 1 wherein the article is ejected from the mold by pressurized fluid.

6. Method of claim 1 wherein the article and mold are separated by actuation of a stripper plate.

7. Apparatus for molding thermoplastic containers comprising a mold defining a mold cavity and a mold core, means for separating said mold container from said mold and from said mold core, said mold core defining a peripherally inward projection near the upper edge of a container molded therein, said peripherally inward projection on the molded container obstructing the path of separation of the container from the mold core, said mold core including a plurality of cams having surfaces forming the upper periphery of said mold core, and means for guiding said cams to radially expand the upper periphery of said molded container to a diameter greater than that of the mold core as the molded container is separated from the mold cavity, whereby said projection does not obstruct the path of separation of said mold core.

8. Apparatus of claim 7 wherein the cams have surfaces as part of the mold cavity in addition to surfaces on the mold core.

9. A mold core for molding plastic containers comprising a cylindrical body, a peripheral indentation therein to form a peripheral lip for a top ring or lid support in the finished molded container, a plurality of cams having surfaces above said indentation, and means for guiding said cams in an outwardly radial direction as the core is separated from the molded container, to stretch and expand said peripheral lip radially to a diameter greater than that of the mold core, whereby said peripheral lip will not impair the separation of said core from said molded container.

10. Apparatus of claim 7 wherein said means for guiding said cams are aligned at an angle of about 1 degree to about 8 degrees from the direction of movement of the mold core out of the container.

11. Method of claim 1 wherein said radial bending is accomplished through a distance transverse to the direction of removing said mold core defined by an angle of about 1 degree to about 8 degrees therefrom.

12. Apparatus of claim 7 including a stripper plate for moving said cams in the direction of the longtitudinal axis of said mold core to separate a newly molded thermoplastic container therefrom.

* * * * *